United States Patent [19]

Reich et al.

[11] Patent Number: 4,919,599
[45] Date of Patent: Apr. 24, 1990

[54] PUMPING SYSTEM FOR A LEAK DETECTING DEVICE

[75] Inventors: Gunter Reich, Cologne, Fed. Rep. of Germany; William Worthington, Syracuse, N.Y.

[73] Assignee: Leybold Aktiengesellschaft, Hanau, Fed. Rep. of Germany

[21] Appl. No.: 359,587

[22] Filed: Jun. 1, 1989

[30] Foreign Application Priority Data

Jun. 1, 1988 [EP] European Pat. Off. ........ 88108769.6

[51] Int. Cl.⁵ .................... F04D 19/04; G01M 3/20
[52] U.S. Cl. .............................. 417/423.4; 73/40.7; 415/90
[58] Field of Search ............... 417/201, 205, 423.4; 415/90, 98, 102, 103; 73/40.7

[56] References Cited

U.S. PATENT DOCUMENTS

| | | | |
|---|---|---|---|
| 3,690,151 | 9/1972 | Briggs | 73/40.7 |
| 4,365,158 | 12/1982 | Tallon | 73/40.7 |
| 4,472,962 | 9/1984 | Mennenga | 73/40.7 |
| 4,550,593 | 11/1985 | Reich | 73/40.7 |
| 4,773,256 | 9/1988 | Saulgeot | 73/40.7 |
| 4,779,449 | 10/1988 | Bley et al. | 73/40.7 |
| 4,785,666 | 10/1988 | Berquist | 73/40.7 |

Primary Examiner—Leonard E. Smith
Assistant Examiner—John A. Savio, III
Attorney, Agent, or Firm—Felfe & Lynch

[57] ABSTRACT

Leak detecting device working on the counter current principle uses a test piece connected to the inlet of a first turbomolecular pump, a gas detector connected to the inlet of a second turbomolecular pump. First and second molecular pumps downstream of the respective turbomolecular pumps have a common outlet connected to a pre-vacuum pump and reduce the effect of test gas substratum. Both turbomolecular and other molecular pumps are on a common shaft, the passages between each turbomolecular and molecular pumping stage being connected.

9 Claims, 4 Drawing Sheets

PUMPING SYSTEM FOR A LEAK DETECTING DEVICE

BACKGROUND OF THE INVENTION

The invention relates to a pumping system for a leak detecting device which operates on the counter current principle with a first turbo molecular pumping stage, to the inlet of which a test piece or a test recipient can be connected and with a second turbo molecular pumping stage, to the inlet of which a test gas detector is connected. Both turbo molecular pumping stages are disposed on a common shaft and have a pre-vacuum pump assigned to their outlets.

The test pieces can be tested for leakage by evacuating the test piece and spraying it from the outside. It is known to fill a smaller test piece with test gas and to place it in a recipient which is subsequently evacuated. If the test gas penetrates the walls, the test piece is not leakproof. The use of a test gas detector which is connected to the evacuating pipe permits detecting whether the test piece is leaky or not. Usually, a mass spectrometer serves as a test gas detector which is calibrated for the mass of the test gas; in the case of helium, it is calibrated detection. It is of particular disadvantage that this helium partial pressure is subject to irregular deviations so that it cannot be eliminated as a constant when the measuring values are evaluated. Presumably, these often strong, irregular deviations of the helium partial pressure are the result of bubbles formed around minute leakages at the oil-sealed vacuum pump; the bubbles are eventually released and move to the inlet side of the pre-vacuum pump where they burst. Furthermore, after a particularly large leak, there is a disturbance in the area around the pre-vacuum pump which affects the sensitivity. This disturbance results from the fact that a part of the relatively high helium pressure is released in the oil of the pre-vacuum pump. The gradually degassing helium causes a helium partial pressure increase in the inlet area of the pre-vacuum pump; this increase can be so high as to falsify the immediately following measurements. Therefore, long recovery times cannot be avoided using leak detecting devices with pumping systems of the kind described.

SUMMARY OF THE INVENTION

The object of the present invention is to achieve a pumping system which reduces the interference liability caused by helium substratum in the area of the pre-vacuum.

A molecular pumping stage configured as a molecular pump, is disposed downstream of each turbo molecular pumping stage; the molecular pumping stages are disposed on the shaft of the turbo molecular pumping stages and there is a connection between the passageway from the first turbo molecular pumping stage to the first molecular pumping stage on one hand and the passageway from the second turbo molecular pumping stage to the second molecular pumping stage on the other hand.

Molecular pumps and turbo molecular pumps belong to friction pumps, the function of which is described in a textbook by Wutz, Adam and Walcher, "Theorie and Praxis der Vakuumtechnik" ("Theory and Practice of Vacuum Technology"), p. 202 et seq. Molecular pumps have a moving rotor wall and a static stator wall with a configuration and a spacing giving the impulses, which are transmitted from the walls to the gas molecules, a preferred direction. Usually, the rotor and/or stator walls have spiral or helical recesses or projections to achieve such a preferred conveying direction. The pumping properties (suction capacity: volume flowing through the suction inlet of the pump; compression: pressure ratio between outlet pressure and inlet pressure with the pressure depending on the kind of gas used) depend on the configuration (depth, width, pitch and so forth) of the thread-like surfaces. Therefore, it is possible to obtain certain pumping properties by means of a particular configuration of the pumping-active surfaces. The suction capacity of molecular pumps, which is basically not as high as compared to turbo molecular pumps, can, for example, be reduced such that the molecular pump merely assumes the function of a seal (molecular sealing), whereas the compression can be very high.

In a pumping system, configured in accordance with the invention, the molecular pumping stages are disposed downstream of the turbo molecular pumping stages; thus, they mostly prevent variations in the helium substratum in the inlet area of the pre-vacuum pump from affecting the mass spectrometer. The molecular pumping stages actually support the effect of the pre-vacuum pump thus avoiding an increase in labor and material involved. There is only minor additional labor and material involved to install the high vacuum pumps, since the molecular pumping stages are disposed on one shaft together with the turbo molecular pumping stages.

It is advantageous to provide a configuration of one of the two molecular pumping stages such that it has a smallest possible suction capacity and a highest possible compression. The suction capacity of the other molecular pumping stage must be sufficiently high enough to transport the gases from the test piece or the test recipient, to the pre-vacuum pump in case of a leak. In such a pumping system, the molecular pumping stage with the higher suction capacity serves to generate and maintain the gas flow required to perform the counter-current leak detection. The molecular pumping stage with the high compression and the low suction capacity prevents deviations of the helium partial pressure at the inlet area of the pre-vacuum pump from affecting the mass spectrometer.

DETAILED DESCRIPTION OF THE PREFERRED EMBODIMENT

Figure 1:
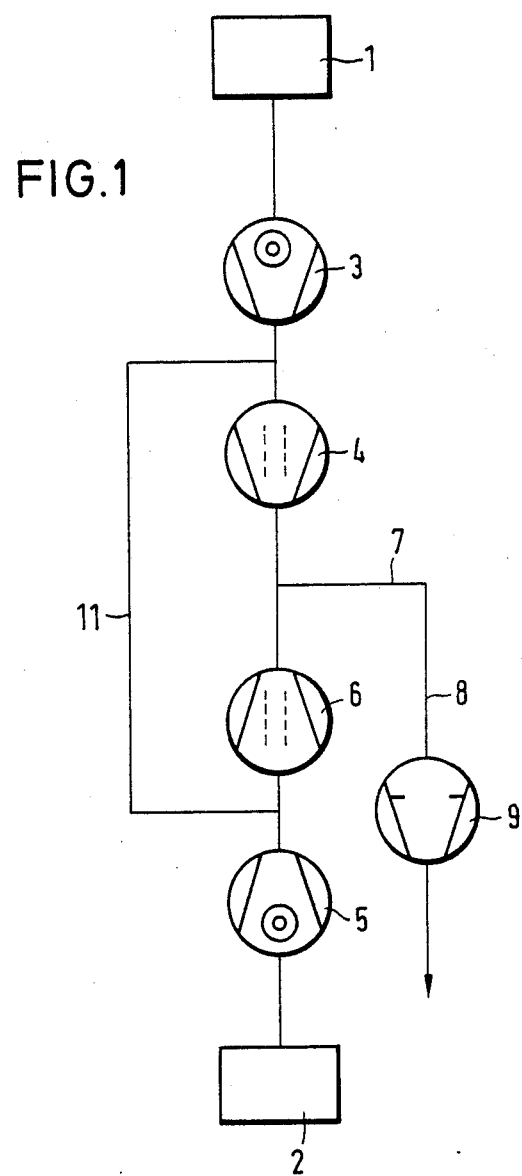
FIG. 1 is a diagrammatic sketch of the pumping system.

In the embodiment according to FIG. 1, the test piece and the test piece recipient are referred to as 1 and the test gas detector, preferably a mass spectrometer, is designated as 2. The turbo molecular vacuum pumping stage 3 and the molecular pumping stage 4 serve to evacuate the test piece or the test recipient 1. These pumping stages are disposed on a common shaft 7′ (FIG. 2) together with an additional turbo molecular pumping stage 5 and an additional molecular pumping stage 6. The pumping stages 5 and 6 serve to generate the working pressure required in mass spectrometer 2. The pre-vacuum pump 9, e.g. a rotary vane pump, is connected via pipes 7, 8 to the molecular pumping stages 4 and 6, the outlets of which are also connected to each other. The passage 10 between the first turbo molecular pumping stage 3 and the first molecular pumping stage 4 and the passage 10' between the second turbo molecular pumping stage 6 and the second molecular pumping stage 6 are connected via pipe 11.

If the molecular pumping stage 6 is assumed to be the pumping stage with the lowest possible suction capacity then the gas is removed from the test recipient 1 via pumping stages 3, 4 and pipes 7, 8 and the pre-vacuum pump 9. If there is a leak, the test gas passes through pipe 11 and —in counter current —through the turbo molecular pumping stage 5 to the mass spectrometer 2. The molecular pumping stage 6 has merely a blocking function, i.e. preventing disturbances in the area of the pre-vacuum pump 9 from affecting the mass spectrometer 2.

Figure 2:
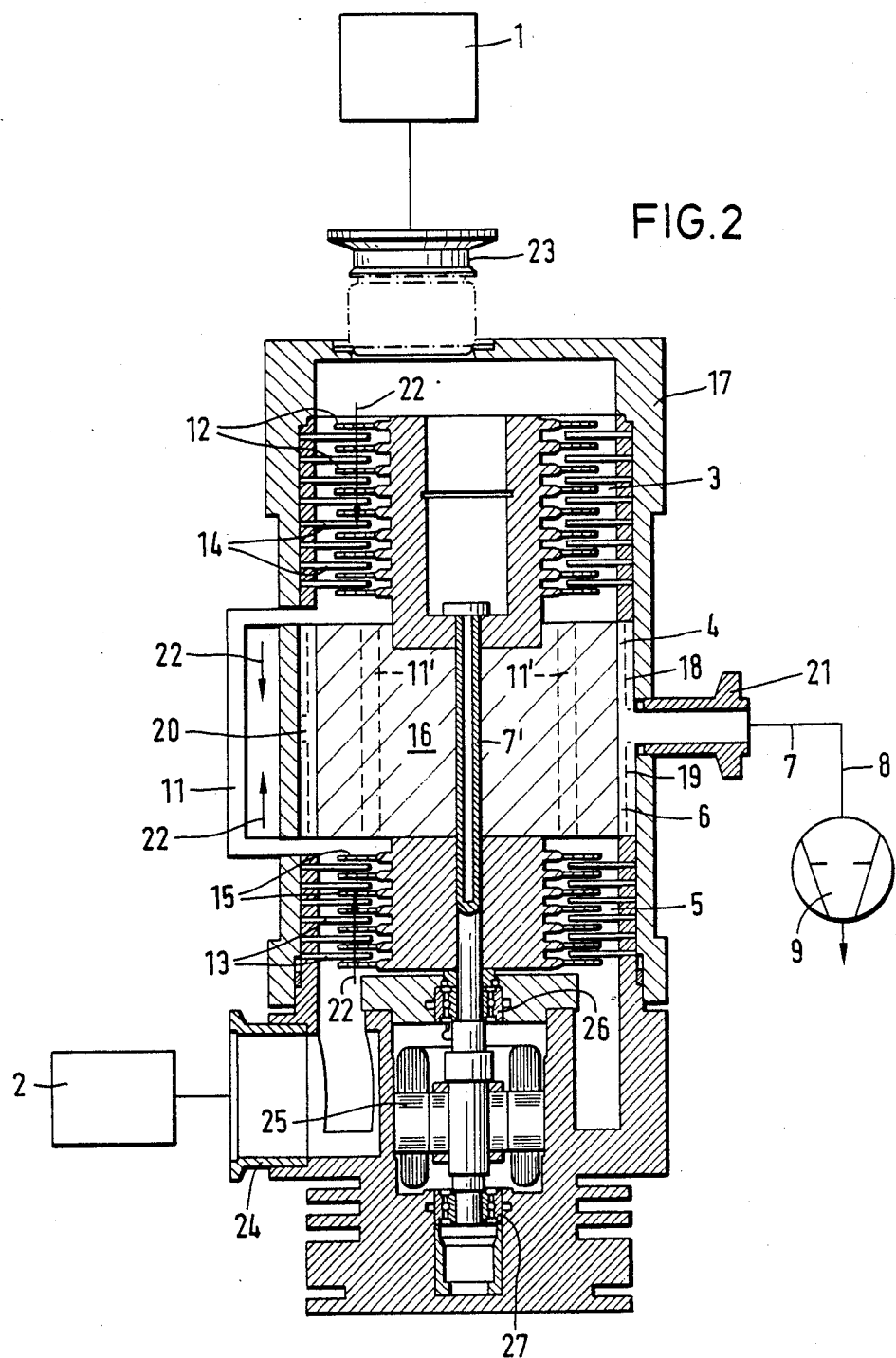
FIG. 2 is a side section view of a practical embodiment.

From the practical embodiment according to FIG. 2 it can be gathered that both molecular pumping stages 4 and 6 are mounted together with both turbo molecular pumping stages 3, 5 on a common shaft 7. Turbo molecular pumping stages 3 and 5 are each provided with rotor vanes 12 and 15 respectively and stator vanes 14 and 13 respectively. A rotating drum 16 with a smooth, cylindrical surface is used to form molecular pumping stages 4 and 6. The inside of housing 17 holds thread parts 18 and 19, which are configured in a desired manner and form the molecular pumping stages 4 and 6 together with the smooth cylinder surfaces of drum 16. Between thread parts 18, 19, there is a ring chamber 20 which is connected to connecting socket 21. The pre-vacuum pump 9 is connected to ring chamber 20 or connecting socket 21. The thread parts 18, 19 can also be on the surface of drum 16 and form molecular pumping stages 4, 6 together with a smooth stator surface.

The arrows 22 at each pumping stage indicate the transport direction. Fittings 23 and 24 for the test piece or test recipient 1 and the mass spectrometer 2 are disposed on the ends of housing 17 opposite to the transporting directions. Shaft 7' is driven by an actuator 25 which is disposed on one of the two ends. Shaft 7' is mounted in bearings 26 and 27 permitting a rotation on the front side of housing 17 where the engine is located.

The connection between the two passages 10, 10' of turbo molecular pumping stages 3 and 5 and respective molecular pumping stages 4 and 6 which is required to perform the counter current leak detection is made by a bypass pipe 11 which is passed on the outside of housing 17. Instead of this bypass pipe 11, one or more axial bores 11' can be provided in drum 16 to connect both passages.

Drum 16 can be of various configuration, e. g. basically solid as represented in FIG. 2. To reduce its mass, it can also be hollow, but its interior must be defined towards the pumping chambers.

Figure 3:
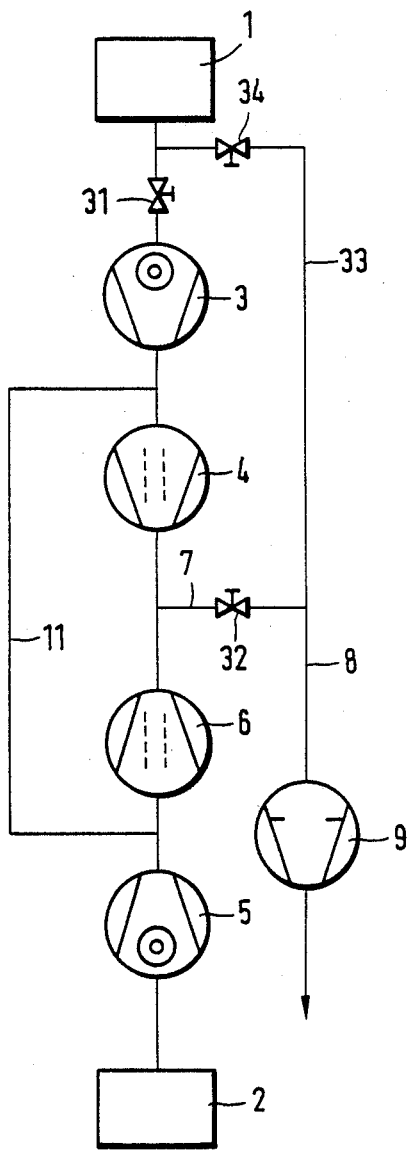
FIGS. 3 to 6 represent an embodiment of the pumping system according to FIG. 1, completed by pipes and valves.

The embodiment according to FIG. 3 features valves 31 and 32 which are disposed between the test piece or test recipient 1 and the first turbo molecular pumping stage 3 as well as in pipe section 7. Moreover, there is a pipe 33 with a valve 34 provided which leads directly from the test piece or test recipient 1 to pipe section 8. This configuration permits to evacuate the test piece or the test recipient via pipe 33 and valve 34 by means of the pre-vacuum pump 9 to the pre-vacuum pressure (appr. 0.1 bar) required for the connection of the turbo molecular pumping stage 3 before the leak detection is performed. Subsequently, valve 34 is closed and valves 31, 32 are opened to start the leak detection.

Figure 4:
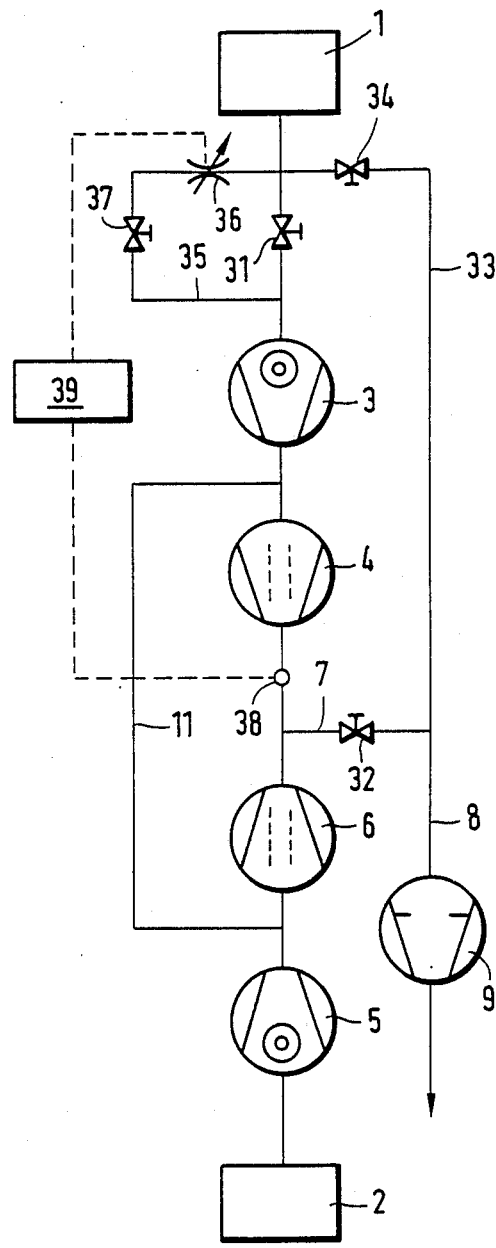

In order to also detect large leaks, it is desirable to start leak detection before reaching the pressure which is required in test piece or test recipient 1 to connect turbo molecular pumping stage 3. For this purpose, the embodiment according to FIG. 4 is provided with a bypass pipe 31, bridging valve 31, with a throttle 36 and a valve 37. This configuration already permits to start leak detection if a pressure is generated in the outlet area of the molecular pumping stage which—depending on the configuration of the molecular pumping stages—exceeds by the factor 100 the pressure at which the turbo molecular pumping stage 3 can be directly connected to test piece or test recipient 1. For this purpose, valve 37 is opened after reaching the maximum pressure in the outlet area of molecular pumping stages 4 and 6, for example at 10 mbar. Throttle 36 must be configured such that the critical inlet pressure of the turbo molecular pumping stage 3 (appr. 0.1 mbar) is not surpassed after opening valve 37. With the pre-vacuum pressure decreasing, the opening of throttle 36 can be continued; therefore, it is advantageously configured to be controllable, that is, in dependence on the pre-vacuum pressure. For such a control function, a pressure sensor 38 is provided, feeding its signals to control unit 39. If there is a large leak, test gas reaches the mass spectrometer 2 in countercurrent via bypass pipe 35, turbo molecular pumping stage 3, bypass pipe 11.

Figure 5:
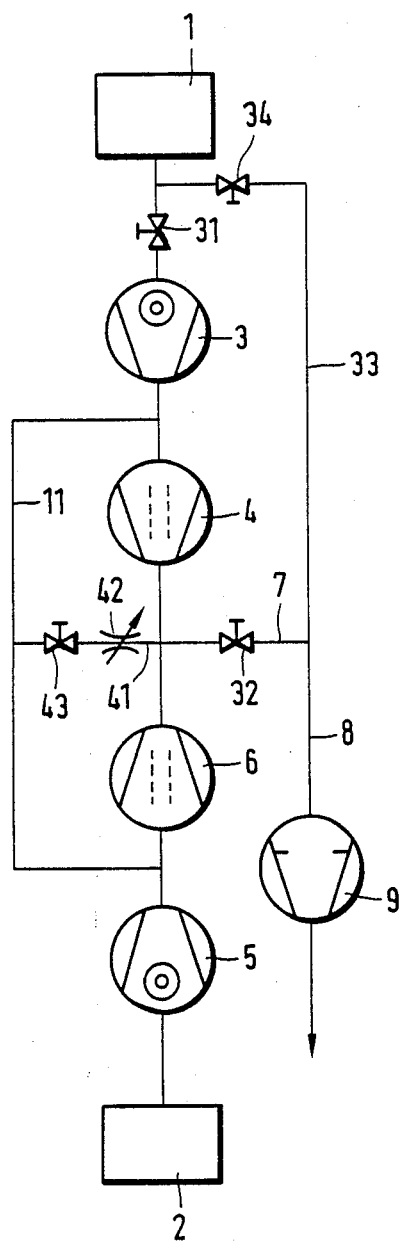

In the embodiment according to FIG. 5, the bypass pipe 11 is connected to the outlet area of molecular pumping stages 4 and 6 via pipe 41 to throttle 42 and valve 43. This embodiment also permits to start leak detection before reaching the pressure required in the test piece or test recipient in order to connect the turbo molecular pumping stage 3. This is achieved by opening valves 32 and 42 after reaching the maximum pressure in the outlet area of the molecular pumping stages 4, 6. Again, the throttle is configured—preferably controllable—such that the outlet pressure of turbo molecular pumping stages 3, 5 do not exceed the critical value (appr. 0.1 mbar) after opening valve 42. In case of a large leak, the test gas reaches mass spectrometer 2 in counter current via pipes 33, 7, 41, and 11 and turbo molecular pumping stage 5.

Figure 6:
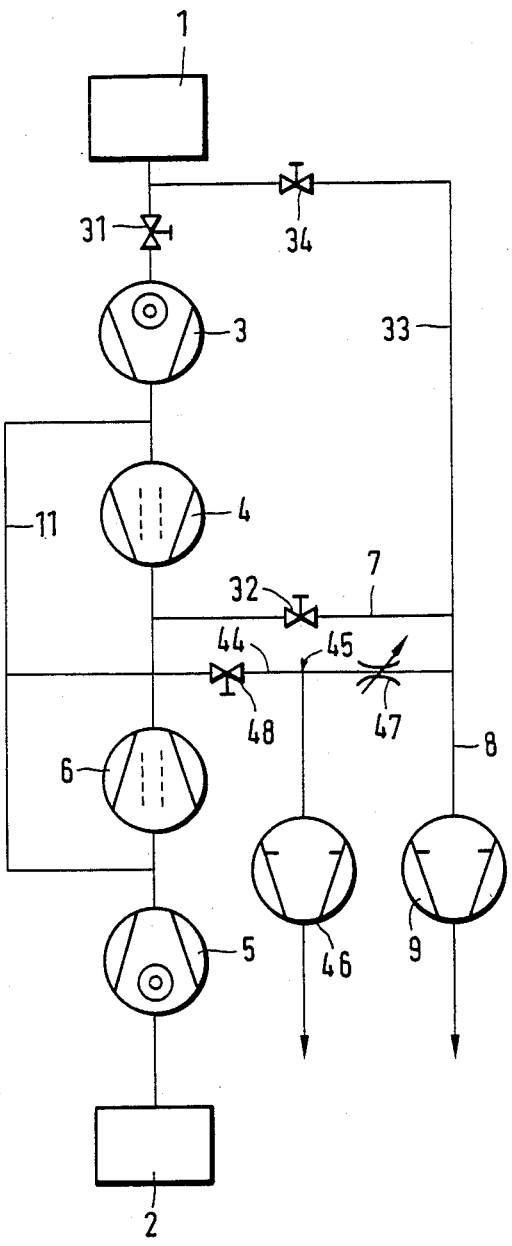

FIG. 6 represents an embodiment which permits detection of large leaks already at the beginning of the evacuation of the test piece or the test recipient 1. For this purpose, a pipe 44 is provided to connect bypass pipe 11 to suction pipe 8 or 33 of vacuum pump 9. There is a throttle 47 between branch point 45 and suction pipe 8 or 33 of vacuum pump 9. A valve 48 is disposed between branch point 45 and bypass pipe 11. Throttle 47 is to be configured such that the pressure in bypass pipe 11, with valve 48 open, does not exceed its critical limit value, independent from the pressure in suction pipe 8 or 33 of vacuum pump 9. In case there is a large leak, a part of the gases flowing through the suction pipe of vacuum pump 9 are evacuated by vacuum pump 46. A portion thereof, in turn, reaches mass spectrometer 2 via valve 48 and bypass pipe 11 and in counter current via turbo molecular pumping stage 5. Preferably, throttle 48 is controllable and can be controlled in dependence of the pressure in suction pipe 8, 33 of vacuum pump 9.

We claim:

1. Pumping system for a leak detecting device for detecting a gas leaking from test piece by means of a gas detector and operating on the counter current principle, said system comprising
- a shaft;
- a first turbomolecular pumping stage on said shaft and having an inlet, to which said test piece is connected;
- a first molecular pumping stage on said shaft downstream of said first turbomolecular pumping stage and connected thereto by a first passage and having an outlet;
- a second turbomulecular pumping stage on said shaft and having an inlet, to which said gas detector is connected;
- a second molecular pumping stage on said shaft downstream of said second turbomolecular pumping stage and connected thereto by a second passage and having an outlet in common with the outlet of the first molecular pumping stage;
- a connection between said first and second passages;
- a pre-vacuum pump having an inlet connected to the common outlet of the molecular pumping stages.

2. Pumping system as in claim 1 wherein said test piece and said gas detector are connected to respective turbomolecular pumping stages at opposite ends of said system, said first and second pumping stages pumping from said opposite ends toward said common outlet therebetween.

3. Pumping system as in claim 1 wherein the first and second molecular pumping stages have a common cylindrical drum.

4. Pumping system as in claim 3 wherein said connection between said first and second passages comprises an axial passage through said drum.

5. Pumping system as in claim 1 further comprising
- a pipe connecting the test piece to the inlet of the pre-vacuum pump, and
- a valve in said connecting pipe.

6. Pumping system as in claim 1 further comprising
- a valve between said test piece and said first turbomolecular pumping stage;
- a bypass pipe bridging said valve between said test piece and said first turbomolecular pumping stage;
- a throttle and a valve disposed in said bypass pipe.

7. Pumping system as in claim 5 further comprising
- a pipe connecting the common outlet of the molecular pumping stages to the connection between the first and second passages, and
- a throttle and a valve disposed in said pipe.

8. Pumping system as in claim 5 further comprising
- a pipe connecting the inlet of the pre-vacuum pump to the connection between the first and second passages,
- a throttle and a valve disposed in said pipe,
- a further pre-vacuum pump having an inlet connected to said pipe between said throttle and said valve.

9. Pumping system as in claim 1 wherein one of said molecular pumping stages has a higher suction capacity than the other molecular pumping stage, said one of said molecular pumping stages serving to perform the countercurrent leak detection.

* * * * *